(12) United States Patent
Saheki et al.

(10) Patent No.: US 6,895,810 B2
(45) Date of Patent: May 24, 2005

(54) TRANSMITTER MOUNTING STRUCTURE FOR TIRE CONDITION MONITORING APPARATUS

(75) Inventors: Setsuhiro Saheki, Gifu-ken (JP); Yoshitaka Ito, Gifu-ken (JP)

(73) Assignee: Pacific Industrial Co., Ltd., Ogaki (JP)

( * ) Notice: Subject to any disclaimer, the term of this patent is extended or adjusted under 35 U.S.C. 154(b) by 16 days.

(21) Appl. No.: 10/706,533

(22) Filed: Nov. 12, 2003

(65) Prior Publication Data

US 2004/0163456 A1 Aug. 26, 2004

(30) Foreign Application Priority Data

Feb. 24, 2003 (JP) ........................................ 2003-046063

(51) Int. Cl.[7] .............................................. B60C 23/02
(52) U.S. Cl. ........................................ 73/146.8; 73/146
(58) Field of Search ................................ 73/146–146.8

(56) References Cited

U.S. PATENT DOCUMENTS

| | | | |
|---|---|---|---|
| 5,665,908 A | * | 9/1997 | Burkey et al. ............. 73/146.8 |
| 5,956,820 A | | 9/1999 | Albinski |
| 6,160,474 A | * | 12/2000 | Tsunetomi et al. .......... 340/442 |
| 6,167,900 B1 | * | 1/2001 | Laird .......................... 137/227 |

* cited by examiner

Primary Examiner—Eric S. McCall
Assistant Examiner—Jermaine Jenkins
(74) Attorney, Agent, or Firm—Colin P. Cahoon; Carstens & Cahoon, LLP

(57) ABSTRACT

A mounting structure for a transmitter of a tire condition monitoring apparatus that enables the transmitter to be attached to wheels having different cross sectional shapes. A wheel has a drop center and a rim formed integrally with the drop center at a predetermined angle relative to the drop center. The mounting structure includes a valve stem arranged on the rim and having a basal end. A casing houses the transmitter. A coupling fixture couples the casing and the valve stem. The coupling fixture includes a coupler coupled to the basal end of the valve stem, an anchor for anchoring the casing, and a connection for connecting the coupler and the anchor so that the coupling fixture is resilient. The angle between the coupler and the anchor is greater than a predetermined angle before the coupling fixture couples the casing and the valve stem.

13 Claims, 4 Drawing Sheets

TRANSMITTER MOUNTING STRUCTURE FOR TIRE CONDITION MONITORING APPARATUS

BACKGROUND OF THE INVENTION

The present invention relates to a transmitter mounting structure for a tire condition monitoring apparatus, and more specifically, to a transmitter mounting structure for a wireless type tire condition monitoring apparatus enabling tire conditions, such as tire air pressure, to be checked from the passenger compartment of a vehicle.

A transmitter for a tire air pressure monitoring apparatus is mounted on a wheel and located in a tire. A mounting structure of the transmitter includes a valve stem, a spring element, and an electronic module for measuring the air pressure of the tire and transmitting the measured air pressure. The valve stem is coupled to the spring element. The spring element has a clamp plate coupled to the electronic module. The clamp plate clamps the electronic module to the wheel. When the wheel is rotating, various forces, such as centrifugal force, act upon the electronic module. The elastic force of the spring element acts to effectively suppress or control the movement of the electronic module. Accordingly, the electronic module is pressed against a drop center of the wheel when mounted on the wheel (refer to U.S. Pat. No. 5,956,820).

The fastening device described in U.S. Pat. No. 5,956,820, however, cannot cope with all the cross sectional shapes of wheels. That is, there are many types of wheels with different cross sectional shapes, such as, wheels with a drop-center rim, a shallow base rim, a broad flat-base rim, and a broad deep rim. Therefore, the valve stem and the casing which houses the transmitter, and ultimately the mounting angle of the electronic module, is unambiguously determined by the cross sectional shape of the wheel. As a result, in order to mount the electronic module in a state pressed against the drop center of the wheel, the spring element and clamp plate must be in correspondence to the cross sectional shape of the wheel.

SUMMARY OF THE INVENTION

One aspect of the present invention is a mounting structure for a transmitter of a tire condition monitoring apparatus arranged in a tire of a vehicle having a wheel. The wheel including a drop center and a rim formed integrally with the drop center at a predetermined angle relative to the drop center. The mounting structure includes a valve stem attachable to the rim of the wheel for charging air into the tire. The valve stem has a basal end. The mounting structure further includes a casing connected to the valve stem to house the transmitter and a coupling fixture for coupling the casing and the valve stem. The coupling fixture includes a coupler coupled to the basal end of the valve stem, an anchor for anchoring the casing and a connection for connecting the coupler and the anchor at an angle to one another so that the coupling fixture is resilient. The angle between the coupler and the anchor is greater than the predetermined angle before the coupling fixture couples the casing and the valve stem to one another.

Another aspect of the present invention is a method of mounting a transmitter of a tire condition monitoring apparatus arranged in a tire of a vehicle having a wheel. The wheel includes a drop center and a rim formed integrally with the drop center at a predetermined angle relative to the drop center. The rim has a valve hole. The method includes preparing a valve stem for charging air into a tire, the valve stem having a basal end, preparing a casing for housing the transmitter, the casing having a projection, preparing a coupling fixture for coupling the casing and the valve stem, the coupling fixture including a coupler coupled to the basal end of the valve stem and having a coupling hole, an anchor for anchoring the casing, and a connection for connecting the coupler and the anchor at an angle to one another so that the coupling fixture is resilient, with the angle between the coupler and the anchor being greater than the predetermined angle before the coupling fixture couples the casing and the valve stem, attaching the casing to the anchor of the coupler, inserting the basal end of the valve stem through a coupling hole of the coupling fixture to couple the basal end of the valve stem to the coupling fixture with a bushing, and attaching the valve stem to the valve hole in the rim when the projection of the casing is abutted against the drop center of the wheel by the resiliency of the coupling fixture.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with the objects and advantages thereof, may best be understood by reference to the following description of the presently preferred embodiments together with the accompanying drawings in which.

DETAILED DESCRIPTION OF THE PREFERRED EMBODIMENTS

Figure 1:
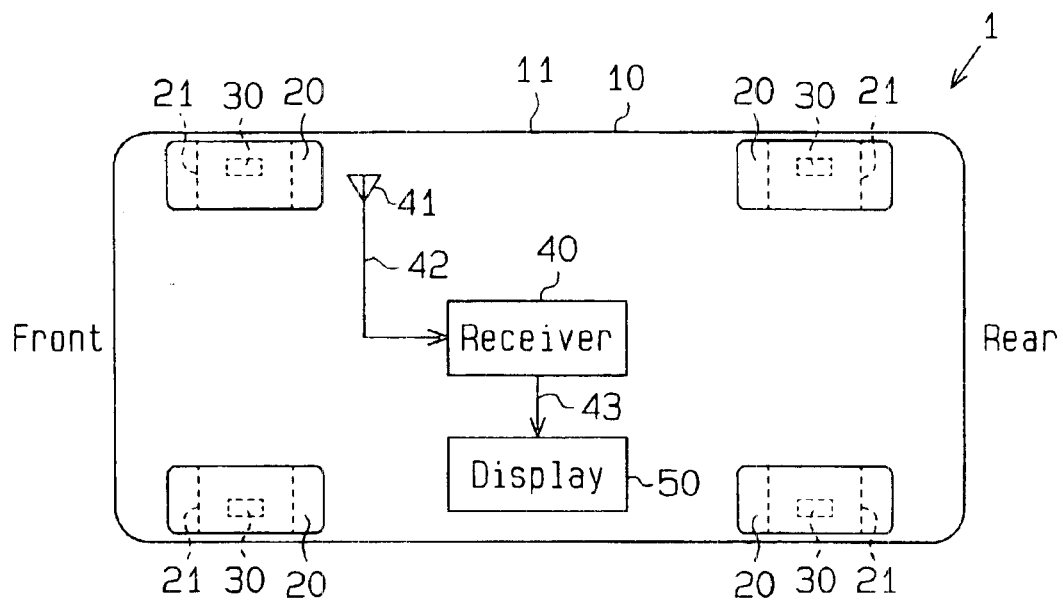
FIG. 1 is a schematic block diagram showing the structure of a tire condition monitoring apparatus according to a preferred embodiment of the present invention.

In the drawings, like numerals are used for like elements throughout.

FIG. 1 is a schematic diagram of a tire condition monitoring apparatus, which includes a transmitter mounting structure according to a preferred embodiment of the present invention. As shown in FIG. 1, the tire condition monitoring apparatus 1 includes four transmitters 30, each arranged in each tire 20 of a vehicle 10, and a receiver 40 arranged in the body 11 of the vehicle 10.

Each transmitter 30 is fixed to the interior of the corresponding tire 20, for example, to the wheel 21 of the tire 20. The transmitter 30 measures conditions of the tire 20, such as the tire pressure in the corresponding tire 20, and transmits the data including the tire pressure data obtained through the measurement in a wireless manner.

The receiver 40 is located at a predetermined position on the body 11 and operated, for example, by electric power from a vehicle battery (not shown). The receiver 40 has a receiving antenna 41, which is connected to the receiver 40 by a cable 42. The receiver 40 receives data transmitted from each transmitter 30 through the receiving antenna 41. A display 50 is arranged within the visual range of the driver of the vehicle 10 in the vehicle compartment. The display 50 is connected to the receiver 40 by a cable 43.

Figure 2:
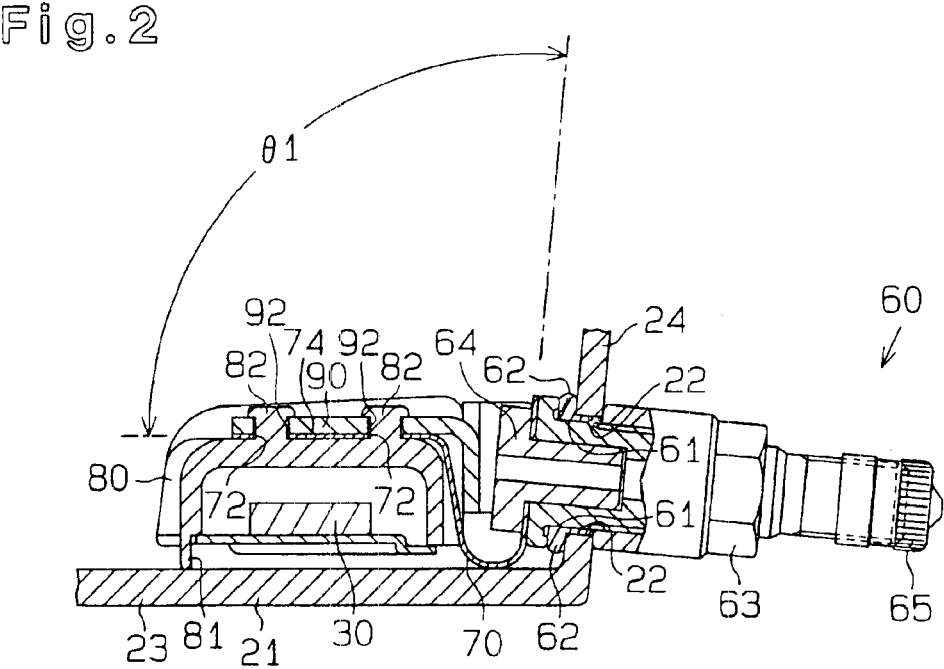
FIG. 2 is a cross sectional view of a transmitter mounting structure for the tire condition monitoring apparatus in the preferred embodiment of the present invention.

As shown in FIG. 2, a connection concavity 61 is formed along the circumferential direction at the basal end of a valve stem 60, which is arranged in the tire 20. A rubber grommet 62 is fitted in the connection concavity 61. The rubber grommet 62 is pressed against the wall defining a valve hole 22 extending through the wheel 21. A valve nut 63 is engaged with the valve stem 60 from the outer side of the wheel 21 to fasten the valve stem 60 to the wheel 21. As a result, the rubber grommet 62 hermetically seals the tire 20.

A plate spring (coupling fixture) 70 is connected to the basal end of the valve stem 60. A bushing 64 is press-fitted into the basal end of the valve stem 60 to connect the valve stem 60 and the plate spring 70. A casing 80, which houses the transmitter 30, and a bracket 90 are attached to the plate spring 70. A projection 81 extends from the bottom surface of the casing 80. The resiliency of the plate spring 70 abuts the projection 81 against a drop center 23 of the wheel 21.

Figure 3:
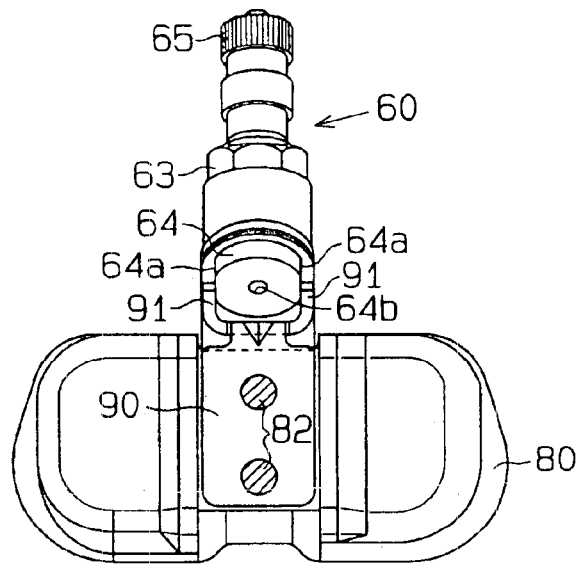
FIG. 3 is a plan view of the transmitter of the tire condition monitoring apparatus of FIG. 2.

As shown in FIG. 3, side walls 64a extend from opposite sides of the bushing 64. A through hole 64b extends through the center of the bushing 64. Air is charged into the tire from the valve stem 60 and through the through hole 64b. A valve cap 65 is engaged with the distal end of the valve stem 60.

Figure 4A:
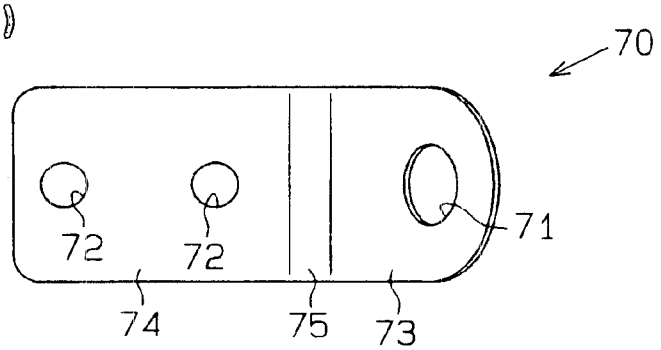
FIG. 4(a) is a plan view showing a plate spring used in the mounting structure of FIG. 2.
Figure 4B:
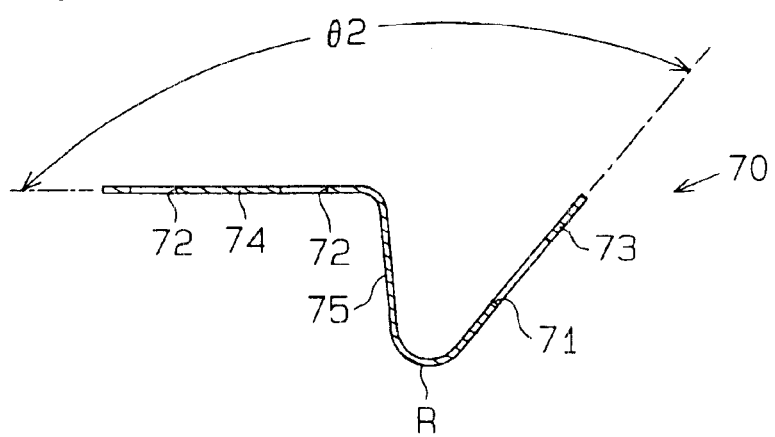
FIG. 4(b) is a cross sectional view of the plate spring of FIG. 4(a)

Referring to FIGS. 4(a) and 4(b), the plate spring 70 is resilient and formed, for example, by bending a thin metal piece until its cross section becomes U-shaped. The plate spring 70 includes a coupler 73 coupled to the basal end of the valve stem 60. A coupling hole 71 extends through the coupler 73. The plate spring 70 also includes an anchor 74, which is anchored to the casing 80, and a connection 75, which connects the coupler 73 and the anchor 74. Two anchor holes 72 extend through the anchor 74. The connection 75 connects the coupler 73 and the anchor 74 so that the plate spring 70 is resilient. More specifically, the connection 75 is bent so as to have a predetermined curvature R, as shown in FIG. 4(b).

Figure 6:
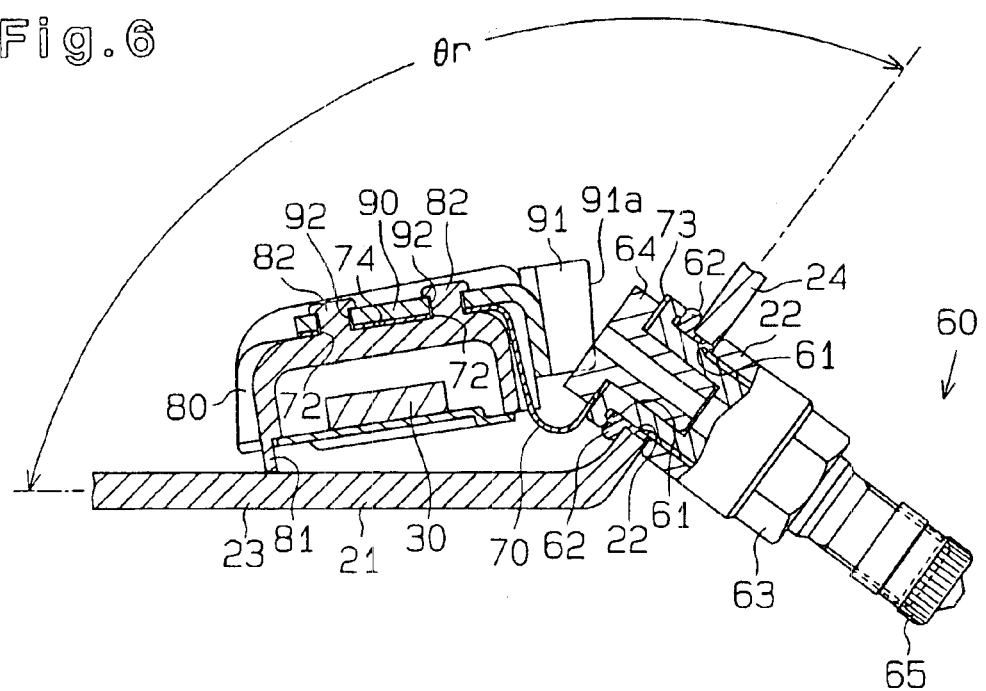
FIG. 6 is a cross sectional view showing the state of a casing for the transmitter mounting structure of the tire condition monitoring apparatus when the vehicle velocity is less than a first speed.

As shown in FIG. 4(b), the angle $\theta 2$ formed between the coupler 73 and the anchor 74 before the plate spring 70 is attached to the valve stem 60 is greater than the angle $\theta 1$ formed between the coupler 73 and the anchor 74 after the plate spring 70. The reason for this is to cope with the various cross sectional shapes a wheel 21 may have. For example, the plate spring 70 may be employed even when the rim angle (second predetermined angle) $\theta r$ formed between a drop center 23 of the wheel 21 and a rim 24 of the wheel 21 is larger than angle $\theta 1$ (first predetermined angle), as shown in FIG. 6. More specifically, before the plate spring 70 is attached to the valve stem 60, the angle $\theta 2$ formed between the coupler 73 and the anchor 74 is set so as to be greater than the angle $\theta 1$ and the angle $\theta r$.

Figure 5:
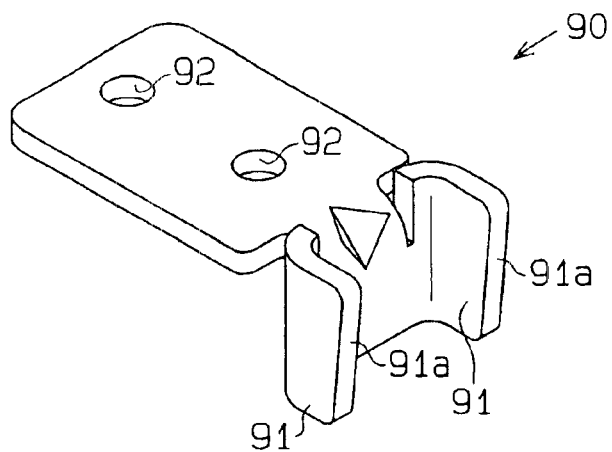
FIG. 5 is a perspective view showing a bracket used in the mounting structure of FIG. 2.

As shown in FIG. 5, a bracket 90 is provided with two rotation regulating walls 91 for regulating the rotation of the plate spring 70. The rotation regulating walls 91 abut against the side walls 64a of the bushing 64 when the valve stem 60 is inserted through the valve hole 22. As shown in FIG. 3, the two rotation regulating walls 91 are formed so as to sandwich the side walls 64a of the bushing 64. Two anchor holes 92 extend through the bracket 90. The anchor holes 92 correspond to the two anchor holes 72 of the plate spring 70.

As shown in FIG. 2, two protrusions 82 extend from the top surface of the casing 80. The protrusions 82 project through the anchor holes 92 of the bracket 90 and the anchor holes 72 of the plate spring 70. The projected part of each protrusion 82 is heated and deformed into a rivet shape. This fixes the casing 80 to the plate spring 70 and the bracket 90.

A method for arranging the valve stem 60 in the valve hole 22 of the wheel 21 will now be described.

As shown in FIG. 6, when the casing 80 is fixed to the plate spring 70 and the bracket 90, the bushing 64 is inserted through the coupling hole 71 of the plate spring 70. Then, the bushing 64 is press fitted to the basal end of the valve stem 60 to connect the basal end of the valve stem 60 to the plate spring 70.

Subsequently, in a state in which the valve nut 63 and the cap 65 are removed, the valve stem 60 is inserted through the valve hole 22 from the inner side of the wheel 21. Then, the valve nut 63 is threadably engaged with the valve stem 60 from the outer side of the wheel 21 to attach the valve stem 60 to the wheel 21. At this time, the plate spring 70, which is coupled to the basal end of the valve stem 60, tends to rotate in the turning direction of the valve nut 63 when threading the valve nut 63 on to the valve stem 60. However, as shown in FIG. 3, the side walls 64a of the bushing 64, which is pressed fitted into the basal end of the valve stem 60, abuts against the rotation regulating walls 91 of the bracket 90.

Further, as shown in FIG. 6, the bracket 90 is fixed to the plate spring 70 by the pair of protrusions 82 of the casing 80.

The projection 81 extending from the bottom surface of the casing 80 is abutted against the drop center of the wheel 21 by the resiliency of the plate spring 70. Therefore, the side walls 64a of the bushing 64 abuts against the rotation regulating walls 91 and regulates the rotation of the plate spring 70 even when the plate spring 70 tends to rotate in the rotation direction of the valve nut 63 when screwing the valve nut 63 on to the valve stem 60. As a result, the plate spring 70 does not rotate in the rotation direction of the valve nut 63 when the valve nut 63 is threaded on to the valve stem 60. Accordingly, the valve stem 60 is attached to the wheel 21 in a state in which the projection 81 of the casing 80 is abutted against the drop center 23 of the wheel 21.

Centrifugal force acts on the casing 80 when the vehicle 10 is moving. The centrifugal force increases in proportion to the velocity of the vehicle 10. Therefore, when the velocity of the vehicle 10 reaches a first velocity (for example, 40 km/h), the centrifugal force becomes greater than the resiliency of the plate spring 70. As a result, when the vehicle 10 is moving at the first velocity or faster, the projection 81 of the casing 80 moves away from the drop center 23 of the wheel 21.

Figure 7:
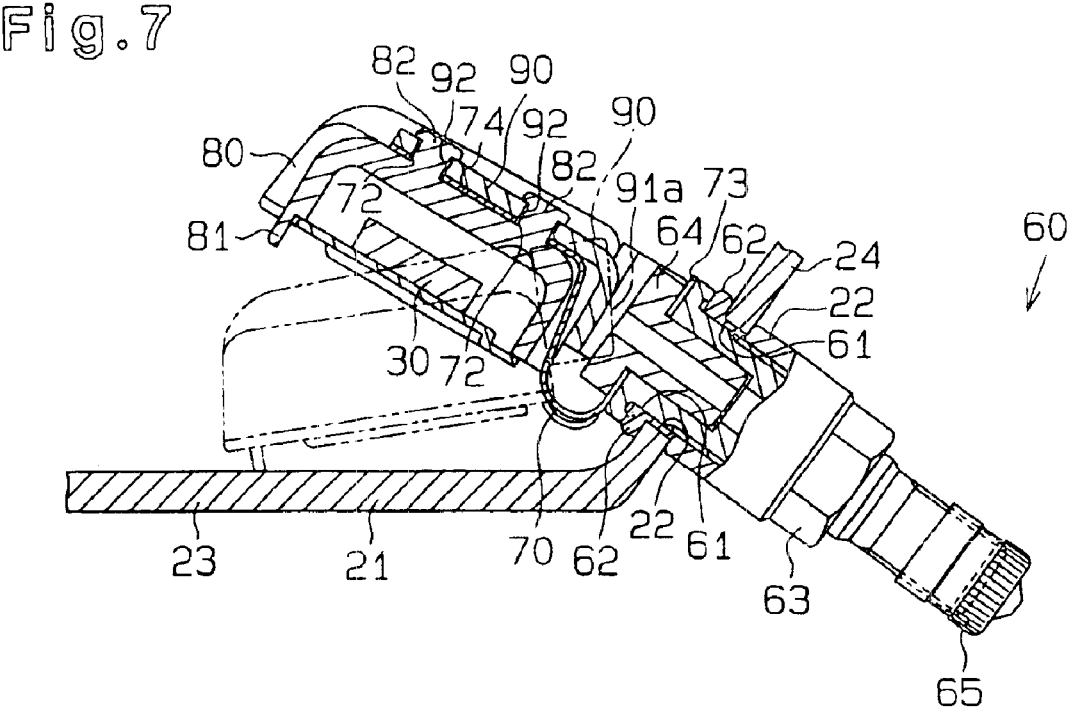
FIG. 7 is a cross sectional view showing the state of the casing of FIG. 6 when the vehicle velocity is greater than or equal to a second speed.

When the vehicle 10 reaches a second velocity (for example, 80 km/h), which is greater than the first speed, distal portions 91a of the rotation regulating walls 91 abut against the coupler 73 of the plate spring 70, as shown in FIG. 7. This restricts further movement of the casing 80 from the drop center 23 of the wheel 21 even when the velocity becomes greater than the second speed. As a result, the resiliency of the plate spring 70 is maintained. When the velocity of the vehicle 10 becomes less than the first velocity, the projection 81 of the casing 80 abuts against the drop center 23 of the wheel 21 again, as shown in FIG. 6.

When the vehicle 10 is not moving or when changing the tire 20, the projection 81 of the casing 80 is abutted against the drop center 23 of the wheel 21. Thus, when changing the tire 20, the bead of the tire 20 does not hit the bracket 90. This prevents the casing 80, which houses the transmitter 30, from being damaged. When the vehicle is moving at a velocity that is greater than or equal to the first velocity, the projection 81 of the casing 80 is moved away from the drop center 23 of the wheel 21. This lessens the influence of the wheel 21 on radio waves transmitted from the transmitter 30. That is, since the casing 80 which houses the transmitter 30 becomes more distant from the wheel 21, which is generally formed of metal, the radio waves transmitted from the transmitter 30 are less affected by the wheel 21. Thus, the reception sensitivity of the receiver 40 improves when the vehicle is moving at a velocity that is greater than or equal to the first speed. Accordingly, the receipt of data transmitted from the transmitter 30 by the receiver 40 through the receiving antenna 41 is ensured.

The transmitter mounting structure for a tire condition monitoring apparatus of the present embodiment has the advantages described below.

(1) The angle θ2 (refer to FIG. 4(b)) formed by the coupler 73 and the anchor 74 of the plate spring 70 before the plate spring 70 is attached to the valve stem 60 is set so as to be greater than the maximum rim angle θr (refer to FIG. 6) formed between the drop center 23 of the wheel 21 and the rim 24 of the wheel 21. Therefore, when the valve stem 60 coupled to the plate spring 70 is attached to the wheel 21, the projection 81 of the casing 80 is abutted against the drop center 23 of the wheel 21. Accordingly, the transmitter 30 may be attached to the wheel 21 regardless of the cross sectional shape of the wheel 21. Thus, when the casing 80 is abutted against the drop center 23 of the wheel 21, the valve stem 60 is attached to the wheel 21 regardless of the cross sectional shape of the wheel 21.

(2) The two rotation regulating walls 91 extending from the bracket 90 abut against the side walls 64a of the bushing 64 when the valve stem 60 is arranged in the valve hole 22 of the wheel 21 to regulate the rotation of the plate spring 70. The side walls 64a of the bushing 64 are located between the two rotation regulating walls 91 to abut against the rotation regulating walls 91. Therefore, the rotation of the plate spring 70 is regulated even when the plate spring 70 tends to rotate in the rotation direction of the valve nut 63 when threading on the valve nut 63 on the valve stem 60. As a result, the plate spring 70 does not rotate in the rotation direction of the valve nut 63 when the valve nut 63 is threaded on to the valve stem 60. Accordingly, the abutment of the projection 81 of the casing 80 against the drop center 23 of the wheel 21 enables the attachment of the valve stem 60.

(3) When the velocity of the vehicle 10 attains a second velocity (for example, 80 km/h) greater than the first velocity (for example, 40 km/h), the distal portions 91a of the rotation regulating walls 91 abut against the coupler 73 of the plate spring 70, as shown in FIG. 7. Therefore, the casing 80 does not separate from the drop center 23 of the wheel 21 even when the vehicle moves at a velocity greater than the second speed. As a result, the elastic return force of the plate spring 70 is maintained. When the velocity of the vehicle 10 decreases to below the first speed, the projection 81 of the casing 80 abuts the drop center 23 of the wheel 21.

(4) Since the electronic module (casing 80) is arranged in a state pressed against the drop center of the wheel 21, a spring element and a clamp plate conforming to the cross sectional shape of a wheel, as described in U.S. Pat. No. 5,956,820, are unnecessary. This reduces the number of parts and facilitates the management of such parts when manufacturing the device. Accordingly, parts are assembled together more efficiently and manufacturing efficiency is improved.

It should be apparent to those skilled in the art that the present invention may be embodied in many other specific forms without departing from the spirit or scope of the invention. Particularly, it should be understood that the invention may be embodied in the following forms.

The relationship between the bushing 64, which is provided with the side walls 64a and press fitted to the basal end of the valve stem 60, and the regulating walls 91, which extend from the bracket 90, may be reversed. That is, the rotation regulating walls may be formed on the bushing 64, and side walls corresponding to the rotation regulating walls may be formed on the bracket 90.

The present invention may be embodied in any type of vehicle that uses a tire 20, such as a four-wheeled vehicle, a two-wheeled vehicle, a bus, or a truck.

The present examples and embodiments are to be considered as illustrative and not restrictive and the invention is not to be limited to the details given herein, but may be modified within the scope and equivalence of the appended claims.

What is claimed is:

1. A mounting structure for a transmitter of a tire condition monitoring apparatus arranged in a tire of a vehicle having a wheel and the wheel including a drop center and a rim formed integrally with the drop center at a predetermined angle relative to the drop center, the mounting structure comprising:
   a valve stem attachable to the rim of the wheel for charging air into the tire, the valve stem having a basal end;
   a casing connected to the valve stem to house the transmitter; and
   a coupling fixture for coupling the casing and the valve stem, the coupling fixture including:
      a coupler coupled to the basal end of the valve stem;
      an anchor for anchoring the casing; and
      a connection for connecting the coupler and the anchor at an angle to one another so that the coupling fixture is resilient, with the angle between the coupler and the anchor being greater than the predetermined angle before the coupling fixture couples the casing and the valve stem to one another.

2. The transmitter mounting structure according to claim 1, wherein the wheel is a first or second wheel with the rim of each of the first or second wheels formed at first and second predetermined angles, respectively, relative to the drop center of each wheel, and the angle between the coupler and the anchor is set so as to be greater than the first and second predetermined angles before the coupling fixture couples the casing and the valve stem.

3. The transmitter mounting structure according to claim 1, further comprising:
   a valve nut for attaching the valve stem to the wheel, and
   a regulating unit for regulating the rotation of the coupling fixture when the valve nut is attached to the valve stem.

4. The transmitter mounting structure according to claim 3, wherein the regulating unit includes:
   a bushing that is press fitted to the basal end of the valve stem; and
   a bracket fixed to the coupling fixture.

5. The transmitter mounting structure according to claim 4, wherein the bracket includes:

a pair of projecting rotation regulating walls, the bushing being located between the rotation regulating walls.

6. The transmitter mounting structure according to claim 5, wherein the bushing includes:

a pair of side walls abutted against the rotation regulating walls.

7. The transmitter mounting structure according to claim 4, wherein the vehicle travels at a predetermined first velocity and a predetermined second velocity, which is faster than the predetermined first velocity, and the bracket and the coupling fixture abut against each other such that the bracket moves away from the drop center of the wheel when the velocity of the vehicle reaches the predetermined first velocity but does not further move away from the drop center of the wheel when the velocity of the vehicle reaches the predetermined second velocity.

8. The transmitter mounting structure according to claim 1, wherein the casing abuts against the drop center of the wheel or moves away from the drop center of the wheel against the resiliency of the coupling fixture in accordance with the velocity of the vehicle.

9. The transmitter mounting structure of claim 1, wherein the coupling fixture is a plate spring.

10. A method for mounting a transmitter of a tire condition monitoring apparatus arranged in a tire of a vehicle having a wheel, the wheel including a drop center and a rim formed integrally with the drop center at a predetermined angle relative to the drop center, the rim having a valve hole, the method comprising:

preparing a valve stem for charging air into a tire, the valve stem having a basal end;

preparing a casing for housing the transmitter, the casing having a projection; preparing a coupling fixture for coupling the casing and the valve stem, the coupling fixture including a coupler coupled to the basal end of the valve stem and having a coupling hole, an anchor for anchoring the casing, and a connection for connecting the coupler and the anchor at an angle to one another so that the coupling fixture is resilient, with the angle between the coupler and the anchor being greater than the predetermined angle before the coupling fixture couples the casing and the valve stem; attaching the casing to the anchor of the coupler;

inserting the basal end of the valve stem through a coupling hole of the coupling fixture to couple the basal end of the valve stem to the coupling fixture with a bushing; and attaching the valve stem to the valve hole in the rim when the projection of the casing is abutted against the drop center of the wheel by the resiliency of the coupling fixture.

11. The method according to claim 10, further comprising:

preparing the bracket with a pair of projecting rotation regulating walls extending from the bracket; and coupling the bracket to the casing and the coupling fixture, wherein the bushing includes a pair of side walls and said attaching the valve stem to the valve hole includes arranging the bushing between the pair of rotation regulating walls such that the rotation regulating walls of the bracket and the side walls of the bushing abut against one another.

12. The method according to claim 11, wherein said attaching the valve stem to the valve hole includes attaching the valve stem to the wheel with a valve nut.

13. The method according to claim 10, wherein the coupling fixture is a plate spring.

* * * * *